March 10, 1970  G. MESSNER ET AL  3,499,829
INCLINED PLANE MERCURY CATHODE ELECTROLYSIS CELLS
Filed March 3, 1967  7 Sheets-Sheet 1

INVENTORS
GEORG MESSNER
ALEXANDER LOUIS BARBATO
HENRY WILLIAM LAUB
RICHARD ERIC LOFTFIELD
BY
ATTORNEYS

United States Patent Office 3,499,829
Patented Mar. 10, 1970

3,499,829
INCLINED PLANE MERCURY CATHODE
ELECTROLYSIS CELLS
Georg Messner, Milan, Italy, and Alexander Louis Barbato, Perry, Henry William Laub, Painesville, and Richard Eric Loftfield, Chardon, Ohio, assignors, by direct and mesne assignments, to Oronzio de Nora Impianti Elettrochimici S.A.S., Milan, Italy, a corporation of Italy
Continuation-in-part of applications Ser. No. 234,309, Ser. No. 234,454, Ser. No. 234,379, and Ser. No. 234,287, Oct. 31, 1962, and application Ser. No. 560,032, May 20, 1966. This application Mar. 3, 1967, Ser. No. 621,399
Int. Cl. C22d 1/04
U.S. Cl. 204—219
9 Claims

ABSTRACT OF THE DISCLOSURE

Describes a multiple tier inclined plane bipolar mercury cathode electrolysis cell and method of operation in which the mercury is discharged into the cell and onto a nickel cathode plate a substantial distance below the upper end of the cell tiers which are maintained substantially filled with electrolyte so as to operate as flooded cells.

---

This application is a continuation-in-part of our prior applications Serial Nos. 234,309, now U.S. 3,308,043, 234,454, now abandoned, 234,379, now U.S. 3,308,047, 234,287 now abandoned, all filed October 31, 1962 and application Ser. No. 560,032, now U.S. 3,304,043, filed May 20, 1966.

This application relates to improvements in the construction and operation of multiple tier bipolar inclined plane mercury electrolysis cells, although some of the improvements described herein may be used in the operation of horizontal mercury cells.

Inclined plane mercury cells are operated with an inclination of the cathode base plate over which the mercury flows of about 2° to about 85° from the horizontal the preferred inclination being between about 5° and about 30° from the horizontal. Horizontal mercury cells are normally operated at an inclination of the cathode base of about 0.25° from the horizontal, but may be operated with an inclination of between 0.16° to 0.5° from the horizontal.

One of the objects of this invention is to provide a multiple tier bipolar inclined plane mercury cell occupying a small amount of floor space but having a high output capacity for electrolysis products.

Another object of the invention is to provide a multiple tier bipolar inclined plane mercury cell which is easy to construct and simple to operate.

Another object of this invention is to provide a multiple tier bipolar inclined plane mercury cell which can be operated by relatively unskilled operating personnel and which will be relatively free of operating difficulties.

Another object of this invention is to provide a multiple tier bipolar inclined plane mercury cell which will be largely self cleaning as to impurities depositing in and floating on the mercury during the electrolysis and from which these impurities can be readily discharged.

Various other objects and advantages of the invention will appear as this description of an illustrative embodiment, shown in the accompanying drawings, proceeds.

While the cell, and its operation, will be described, as an illustrative embodiment, for the production of chlorine and caustic soda by the electrolysis of sodium chloride brine, it will be understood that the apparatus and process may be used for the electrolysis of other alkali metal salts, such as lithium, potassium, cesium and rubidium chlorides, for the electrolysis of other salts which undergo decomposition under electrolysis conditions which are produced in a flowing mercury cathode electrolysis cell.

Figure 1:
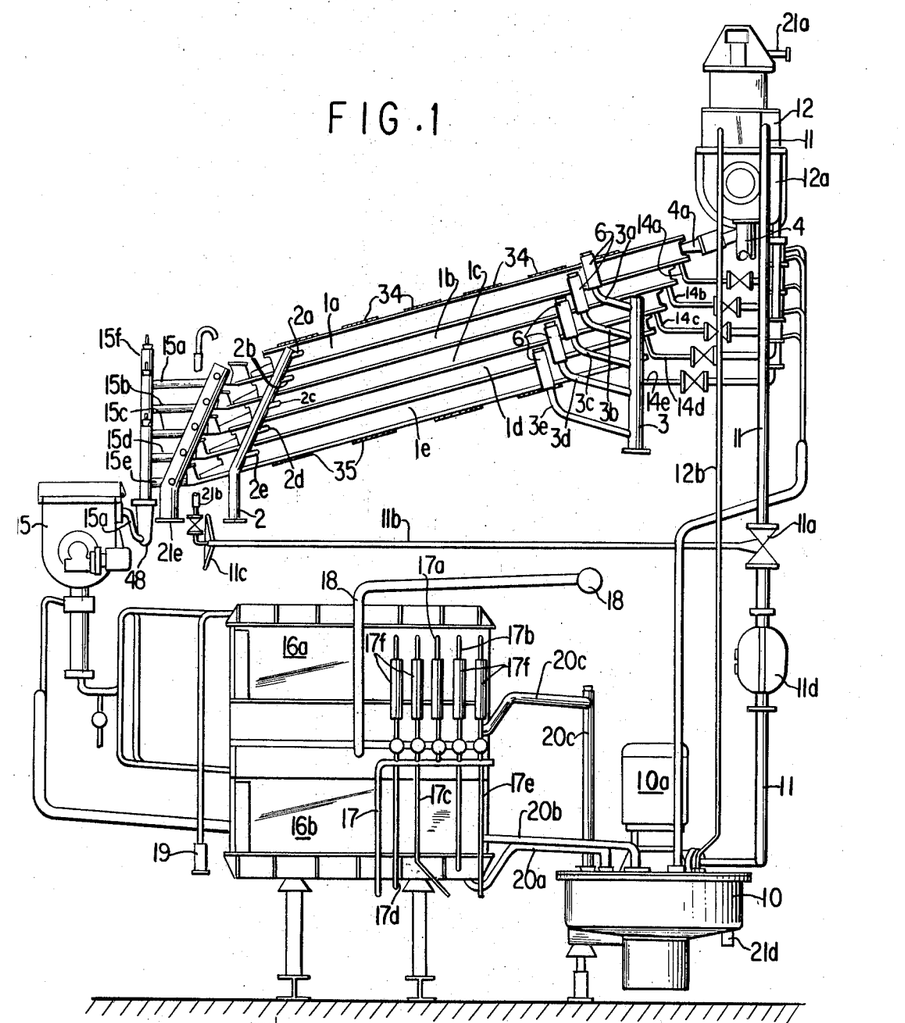
FIG. 1 is a side elevation of a five tier bipolar inclined plane cell together with the mercury feeder, amalgam recovery means and amalgam decomposer.
Figure 3:
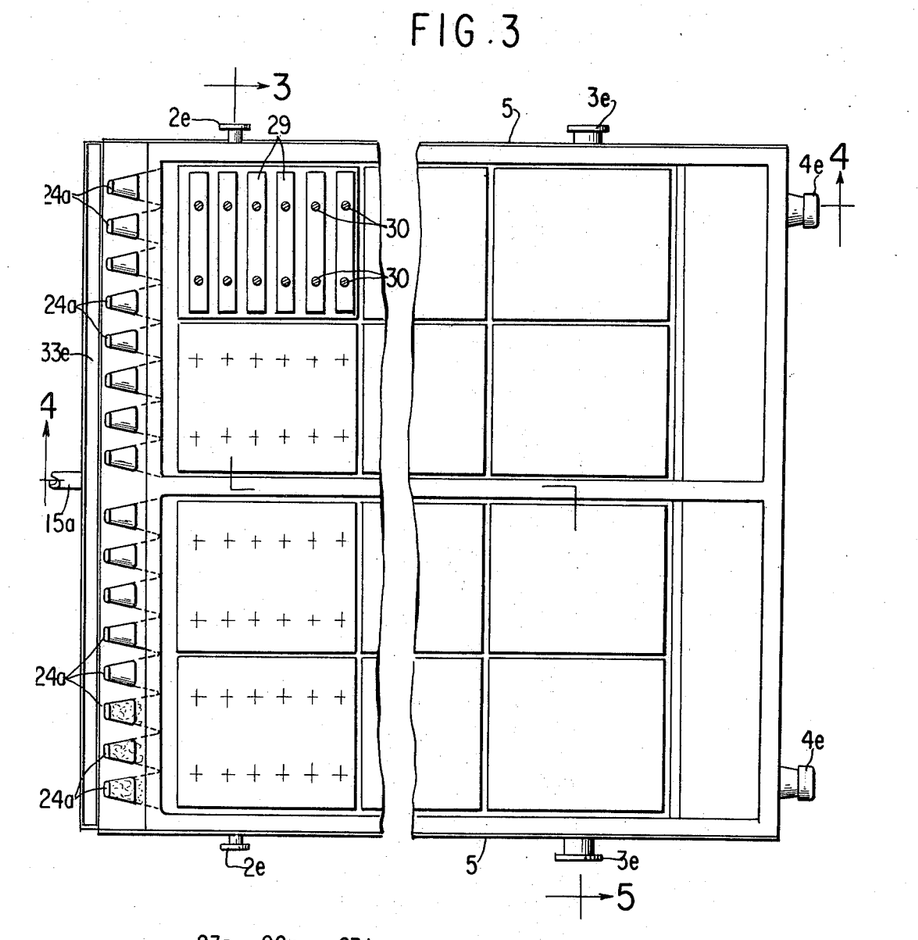
FIG. 3 is a part sectional plan view of the bottom tier of a multi tier cell taken essentially along the line 3—3 of FIG. 4.
Figure 5:
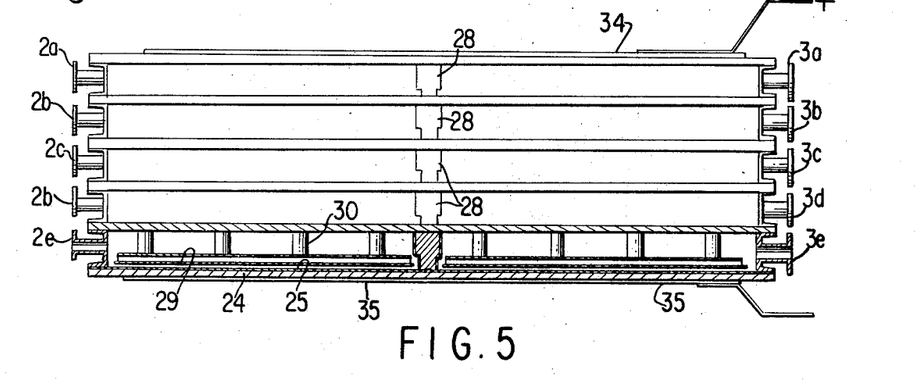
FIG. 5 is a sectional view taken along the line 5—5 of FIG. 3.

Referring to FIG. 1 the cell illustrated comprises five tiers 1a, 1b, 1c, 1d and 1e stacked one on top of the other and so that electrical current impressed on the top tier will flow through the entire stack to the bottom tier, making the cell operate as a bipolar cell. The tiers are essentially rectangular box-like structures as illustrated in FIG. 3, but the side rails 5 instead of being paralled preferably converge toward each other from the top end to the bottom end of each tier. This convergence is preferably about ½" for every 6' of cell lengths. Convergence of the side walls insures better mercury coverage at the side edges of the cells, as the mercury flows from the inlet to the outlet of each tier. The tiers are preferably stacked in an offset manner in a stair tread pattern as illustrated in FIGS. 1 and 5, although they may be offset transversely instead of longitudinally. Concentrated brine from the headers 2, one located preferably on each side of the cell, flows through conduits 2a, 2b, 2c, 2d and 2e into the individual tiers and depleted brine flows from the tiers through conduits 3a, 3b, 3c, 3d and 3e to the depleted brine headers 3, one located preferably on each side of the cell, from which it is returned to the saturation system for resaturation. Brine outlet level regulators located within the enlargements 6 of outlet conduits 3a, 3b, etc., but not shown in detail, permit regulation of the level of the brine in each tier so that each tier may be kept substantially filled or "flooded" with electrolyte to the upper edge thereof as indicated by the brine level lines A in FIG. 4.

Figure 4:
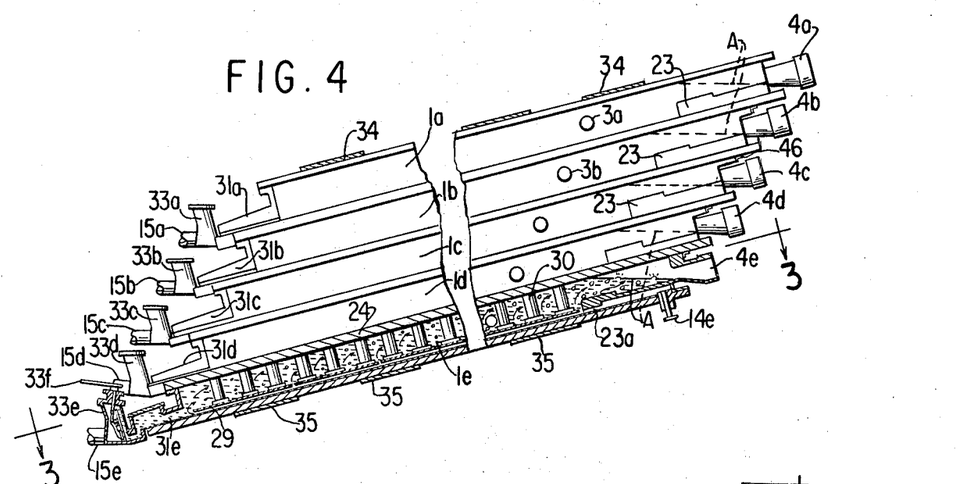
FIG. 4 is a side view of a five tier cell showing the bottom tier in section, taken substantially along the line 4—4 of FIG. 3.

When sodium chloride is being electrolyzed the electrolysis gas (chlorine) flows through the gas outlets 4a, 4b, 4c, 4d and 4e, one located at each side of the upper end of each cell tier, into a chlorine gas header 4 and then to the chlorine recovery system. Only one gas outlet 4a is illustrated in FIG. 1, but gas outlets are provided for each tier as illustrated in FIGS. 3 and 4. While it is preferred to feed substantially saturated brine into the lower end of each tier and remove the depleted brine near the top of each tier, the brine can be fed into and removed from either end of the tiers or at any place along the tiers.

Figure 6:
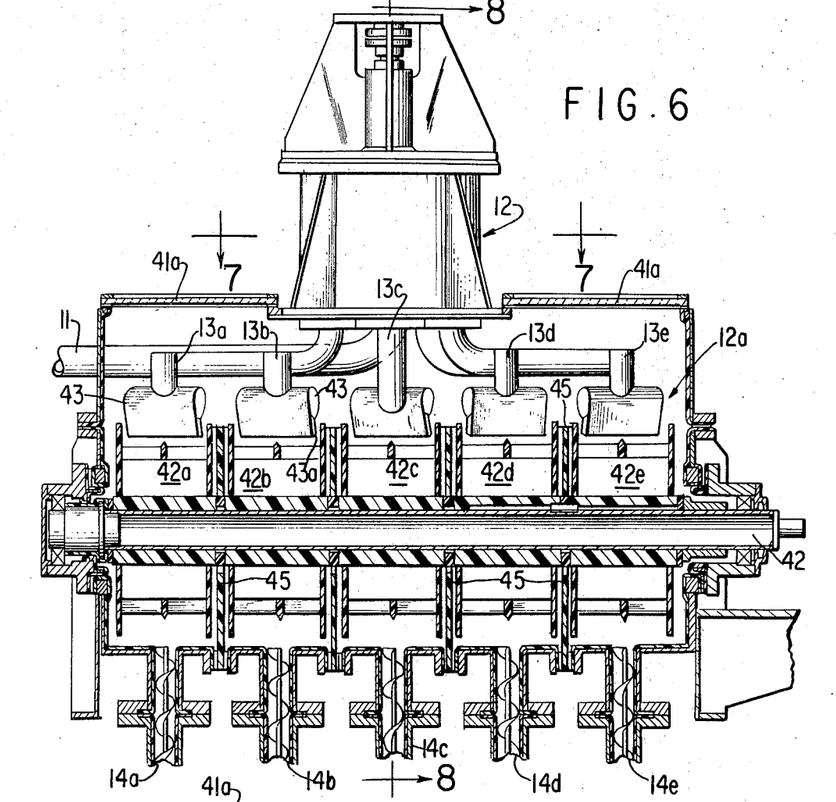
FIG. 6 is a part sectional view of the proportionating mercury feeder and star wheel circuit breaker.

Mercury is fed to tiers 1a, 1b, 1c, 1d and 1e by means of pump 10, driven by a motor 10a, through the main mercury circuit conduit 11 to the mercury feed proportionator 12 where it is separated (FIGS. 6 to 8) into five separate but equal streams and passes through conduits 13a, 13b, 13c, 13d and 13e, FIG. 6, to the mercury feed star wheel circuit breaker 12a and then through conduits 14a, 14b, 14c, 14d and 14e into the cell tiers. Water separators and traps (not shown) may be provided in the conduits 14a, 14b, 14c, 14d and 14e to insure separation of water and solids from the mercury streams before they enter the cell tiers. Mercury to proportionator 12 which is in excess of the amount required is returned to pump 10 by way of conduit 12b. A control valve 11a controllable from a control rod 11b and handle 11c may be used by the cell operator to control the mercury flow through conduit 11 from a position at the lower end of the cell. An electromagnetic flow meter, or any other type of mercury flow meter 11d is located in the line 11 to measure the flow of mercury therethrough. The function of the proportionator 12 and circuit breaker 12a will be described more fully in subsequent paragraphs.

The mercury flows by gravity through the cell tiers wherein the brine is electrolyzed to produce chlorine and the mercury picks up sodium becoming a sodium-mercury amalgam.

The cell tiers 1a, 1b, 1c, 1d and 1e are parallel and are preferably inclined about 15° from the horizontal, although an inclination from about 0.16° to 85° may be used. Where the cell tiers are inclined, preferably between 5° and 30°, from the horizontal, the increased speed and turbulence of the mercury flow relative to the electrolyte increases the efficiency of the cell. Only five cell tiers have been shown, however, any number of bipolar cells in tiers, one on top of the other, may be used.

The amalgam is discharged at the lower end of each of the cell tiers through conduits 15a, 15b, 15c, 15d and 15e (FIG. 2) into an amalgam discharge circuit breaker 15 where the amalgam from the separate tiers is separated into individually separate increments which may be fed into separate decomposers as illustrated in FIG. 1 or combined into a single stream which passes to a single decomposer for the streams from all the cell tiers. As illustrated in FIG. 1 five separate decomposers are used but only two decomposers 16a and 16b are visible in this figure, the other three decomposers are located behind the decomposers 16a and 16b. All the decomposers are located under the cell thereby conserving floor space.

In the decomposers, water flowing from the inlet 17 flows through the lines 17a, 17b, 17c, 17d and 17e and through the decomposers where it is contacted with the amalgam to produce hydrogen, which is discharged through the header 18, and sodium hydroxide, which flows through the line 19 to a recovery system, and the mercury substantially freed from sodium is recycled through the lines 20a, 20b, 20c and not visible lines 20d and 20e back to pump 10. A rotameter 17f in each of the water feed lines visibly shows the flow of water in each line.

In the pump 10 all of the mercury is at ground potential and the individual streams fed into the cell tiers and discharged as amalgam from each cell tier must be provided with circuit breakers 12a and 15 at the inlet and outlet ends of the cell tiers to break the mercury and amalgam circuits at these points, as each tier operates at a different voltage.

Wash water for flushing the cells, for washing the mercury in proportionator 12, in the star wheel circuit breakers 12a and 15, for the pump 10, for flushing the end boxes 33a to 33e, etc. (FIG. 4) is provided where needed. Many of these water inlet and outlet lines are not shown because they would only complicate the drawings, 21a indicates the water inlet to proportionator 12 and 21b, 21c, 21d, etc., indicate wash water inlets or drains.

The mercury enters the cell tiers 1a, 1b, 1c, 1d and 1e from the conduits 14a, 14b, 14c, 14d and 14e through the bottom or upper end wall of the tiers as illustrated more particularly in FIGS. 4, 12, 13, 14 and 14A, and flows into cross-channel 22 formed in a Lucite or other insulating header bar 23, which extends from side to side of each tier. The header bars 23 extend from side to side of each tier and a substantial distance downward along the cathode base plates 24 of each tier and terminate in series of comb tooth lips 23a, FIG. 13, which perform the function of spreading the mercury uniformly over the cathode base plate of each tier and of bringing the mercury into contact with the electrolyte well below the electrolyte level A which is indicated in FIG. 4 so that the incoming mercury does not contact the chlorine in the gas space above the level A.

Figure 13:
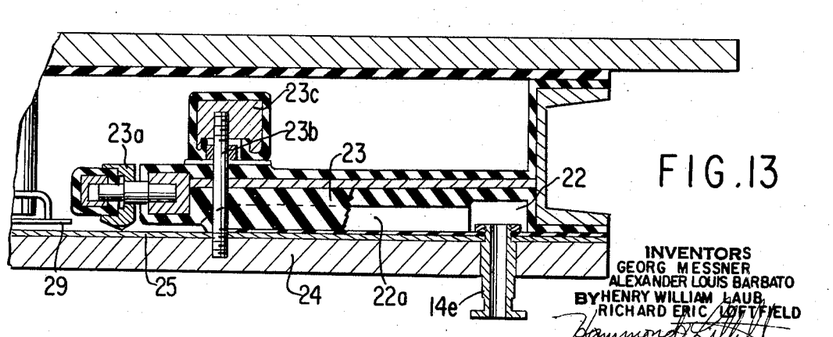
FIG. 13 is a detailed sectional view of a mercury spreader.

The header bars 23, FIGS. 4 and 13, have passages 22a extending from the cross-channels 22, which discharge the mercury onto the cathode base plate above the comb tooth lips 23a and above the first anode plate 29. Hold down bolts 23b extending between the base plates 24 and insulated nuts 23c hold the lower end of the header bars 23 firmly against the cathode base plates 24 and insure uniform distribution of the mercury on the base plates and the maintenance of a uniform passage at the discharge end of header bars 23 so as to provide a uniform flow of mercury onto the base plates 24–25 and down the cathode surface of each tier. In the embodiment illustrated the header bars 23 extend about ⅙ the internal distance from one end to the other of each tier. Distances of this order are characterized as substantial distances in the specification and claims hereof.

Figure 14:
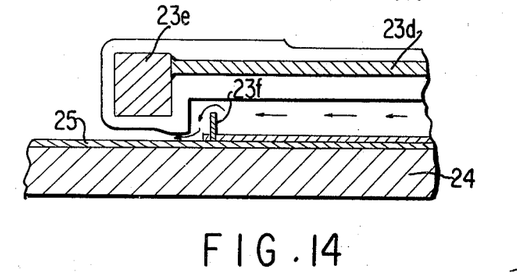
FIGS. 14 and 14A are sectional views of modified forms of mercury spreader which may be used.
Figure 14A:
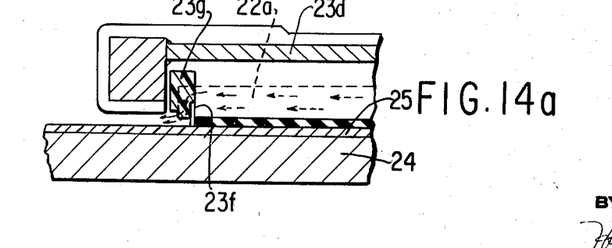

FIGS. 14 and 14A illustrate modified forms of mercury spreaders. In FIG. 14 a steel plate 23d terminating in a steel bar 23e and encased in Lucite or rubber insulation separates the mercury channels from the electrolyte and a nickel bar 23f provides a dam behind which a reservoir of mercury forms and flows over the dam and under the forward edge of the spreader to provide uniform flow and spreading of the mercury over the nickel base plate 25. FIG. 14A shows a Lucite insert 23g installed between the dam 23f and the forward edge of the spreader to protect the outlet from erosion by the mercury flow.

Figure 10:
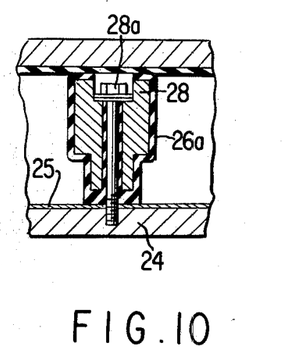
FIG. 10 is an enlarged section of the hold down bars for the nickel plates on the cathode base.
Figure 11:
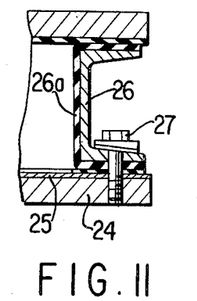
FIG. 11 is a detailed sectional view of a side wall of one tier of a cell.

The cathode base plates 24 are preferably of machined steel approximately ¾ inch thick and an approximately ⅛ inch sheet of nickel 25 is put on the top of each sheet 24 to provide a better surface for the flow of the mercury. The contact between the nickel sheets 25 and the plates 24 should be as good as possible for better electrical conductivity between these plates, an electrically conductive adhesive may be used between these plates, and the nickel plates 25 are held in contact with the plates 24 by the side walls 26, FIG. 11, and bolts 27 which secure the side walls to the base. A center hold down bar 28 extending longitudinally of each tier is held down by bolts 28a to maintain the nickel plates 25 in contact with the center of the cathode base plates 24 (see FIG. 10). This also permits nickel sheets which are only one-half the width of the cell to be used, as the joint between the two halves of a nickel sheet will come below each hold down bar 28. The hold down bars 28 have holes (not shown) running through the bars so that electrolyte can flow through the bars 28. When the surface of the nickel plates has become roughened and pitted due to the action of the flowing mercury and brine, the tiers of the cell can be disassembled and the nickel plates turned over to present a new smooth surface for mercury flow thereover. Nickel clad steel plates can, however, be used as cathode plates in place of the separate nickel plates. We have found that nickel base plates corrode less than steel base plates and that much less mercury butter is formed in the cells when nickel base plates are used.

The anodes consist preferably of perforated platinum plated titanium sheets 29, FIGS. 3, 4, 5 and 9, which are supported by conductor rods 30 screwed or otherwise electrically connected, into the cathode base plate 24 of the tier above. The anodes are spaced a short distance above the cathode base plate of the tier in which they are suspended, to thereby form an electrolyte gap between the suspended anodes and the flowing mercury cathode. The exposed sides of the rods 30, the side and end walls of the tiers and the bottom of the cathode plates 24 exposed to the electrolyte are covered with a suitable insulating layer 26a. All other parts of the cell tiers not intended to act as conductors are likewise protected by insulation against current leakage and corrosion by the electrolyte and chlorine.

As the tiers are operated substantially filled or flooded with electrolyte, the chlorine gas bubbles released at the surfaces of perforated anode sheets 29 flow vertically upward through the electrolyte and diagonally upward along the top of each tier as indicated by the bubbles and arrows in FIG. 4 to cause violent agitation and circulation of the electrolyte which maintains the temperature and the composition of the electrolyte substantially constant from end to end of the cell tiers.

During its flow down the cathode base plates 24–25 the mercury is converted into a sodium mercury amalgam. Also due to the slope of the base plates, preferably about 15° from the horizontal, the flowing mercury cathode accumulates considerable momentum or kinetic energy which it is desirable to absorb within the cell tiers while avoiding splashing of the mercury into droplets which would be attacked by the chlorine in the electrolyte. To partially absorb this kinetic energy and cause swirling of the amalgam in the end boxes 31a, 31b, 31c, 31d and 31e, the lower end of the cathode base plates 24 are provided with a series of V shaped constricted openings 24a, FIG. 3, which constrict the flow of the amalgam and cause it to form a swirling pool in the pockets of the V shaped openings 24a as indicated by the arrows in the three V shaped openings at the lower left side of FIG. 3. Lucite windows 32, FIG. 9, may be provided for each of these pools in the V shaped openings in FIG. 3. This enables the cell operators to observe the flow of amalgam into the end boxes. These windows may, however, be omitted and steel plates used to close the top of the end box pockets.

Figure 2:
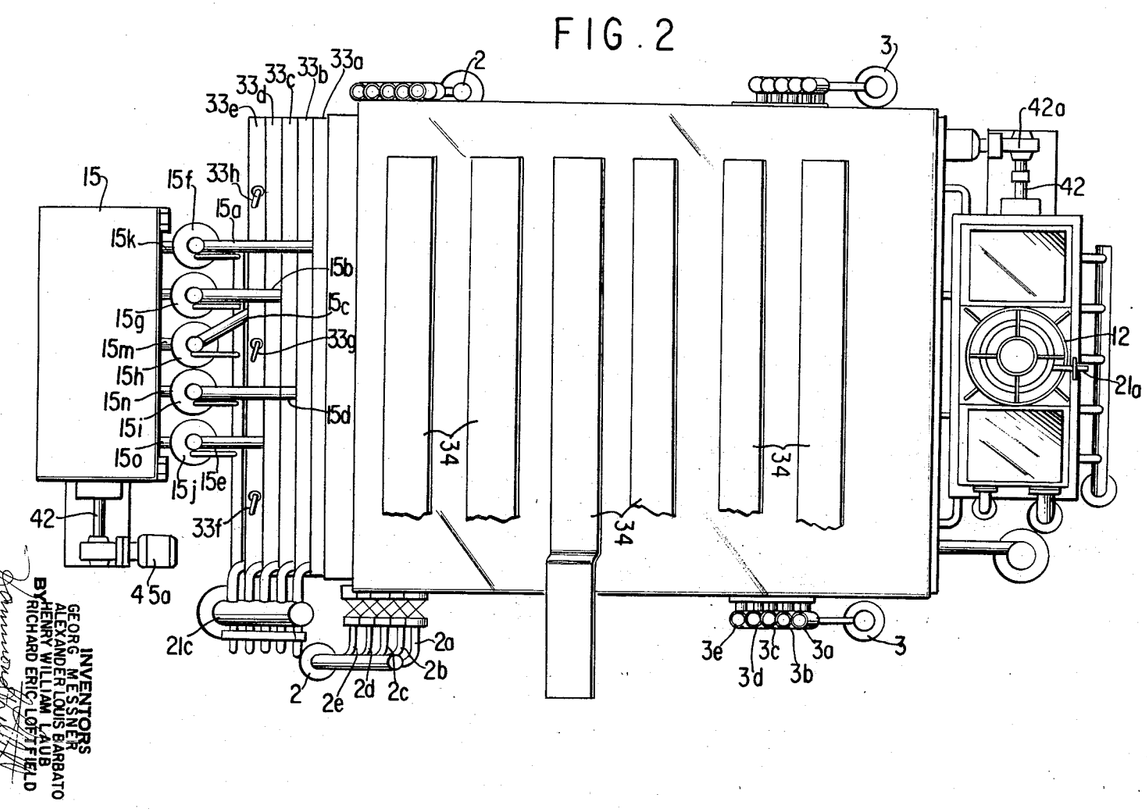
FIG. 2 is a plan view of the embodiment illustrated in FIG. 1, with parts broken away.
Figure 9:
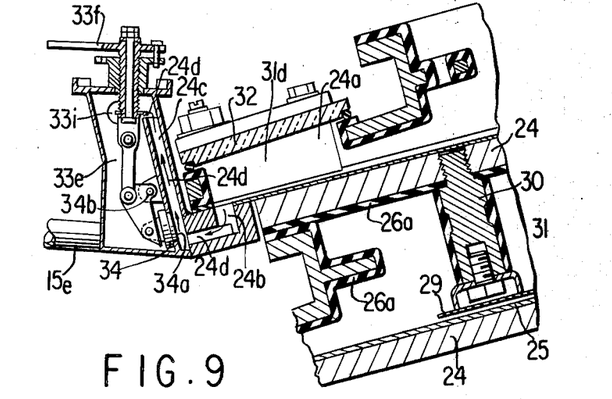
FIG. 9 is a detailed view of one of the end box flush valves.

The amalgam flows from the bottom of the pockets 24a through passages 24b and channels 24c as indicated by the arrows 24d, FIG. 9, into amalgam discharge troughs 33a, 33b, 33c, 33d and 33e and then through conduits 15a to 15e to the amalgam circuit breaker 15. In the pockets 24a the amalgam is still in contact with the electrolyte above it and at the same time is under cathodic protection because of the negative charge on the plates 24 and 25. The violent agitation of the electrolyte tends to dissolve or mechanically carry out of the cells tiers any impurities which float on top of the swirling amalgam pools in the pockets 24a. If these impurities, however, appear to the operator to be excessive, a series of three flush valves 33f, 33g and 33h, FIG. 2, is provided in each of the amalgam discharge troughs 33a to 33e. By turning the handles of the valves 33f, 33g or 33h the valve pulg 34, FIG. 9, is swung around the pivot 34b to remove it from the opening 34a and permit amalgam and electrolyte to flush through the passage 24b and opening 34a and into the troughs 33a to 33e to clear impurities from the amalgam in the discharge end of the tiers. By providing three such valves along each end box trough it is possible to flush one part of a tier while another part is operating and the loss of electrolyte is reduced. In the end boxes the electrolyte separates immediately from the amalagm by gravity and water flush lines such as 33i are provided to flush the surface of the amalgam in the trough 33a to 33e with water and to discharge the wash water through wash water outlet manifold 21e, FIG. 1. Only one set of valves 33f, 33g, 33h have been shown in FIG. 2, but it will be understood that a set of three such valves is provided in each trough 33a to 33e.

From the conduits 15a, 15b, 15c, 15d and 15e which are at different heights, the amalgam flows through vertical passages 15f, 15g, 15h, 15i and 15j, FIG. 2, into amalgam collector boxes 48, FIG. 1, which are at the level of the circuit breaker 15 and then through passages 15k, 15l, 15m, 15n and 15o into the five star wheel compartments in circuit breaker 15 which is similar to and operates on the same principle as the star wheel circuit breaker 12a described in connection with FIG. 6. Spiral flights in the passages 15f, 15g, 15h and 15i and 15j break the fall of the amalgam and prevent it splashing. The five collector boxes 48 are kept filled with wash water on the top of the amalgam pool therein and means are provided to periodically flush wash water over the surface of the amalgam to clean the amalgam at this point.

Anode bus bars 34 are attached to the top of tier 1a and cathode bus bars 35 are attached to the bottom of tier 1e. The cell operates as a bipolar cell and the current passes from the anode connections through each tier to the cathode connections. Each tier operates at a different voltage because of the voltage drop through the preceding tier but only one set of positive and negative bus bar connections are needed for each cell stack.

Since the bipolar tiers operate at different electric potentials it is necessary to break or insulate the mercury feed stream to and from each tier to prevent short circuiting, and arcing between mercury streams at different potentials. It is also desirable to provide substantially the same amount of mercury feed to each tier so that the tiers will operate with substantial uniformity.

Figure 7:
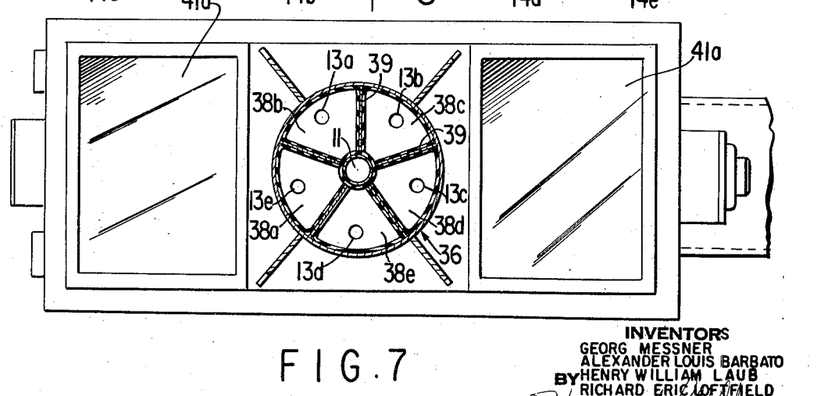
FIG. 7 is a part sectional plan view taken along the line 7—7 of FIG. 6.
Figure 8:
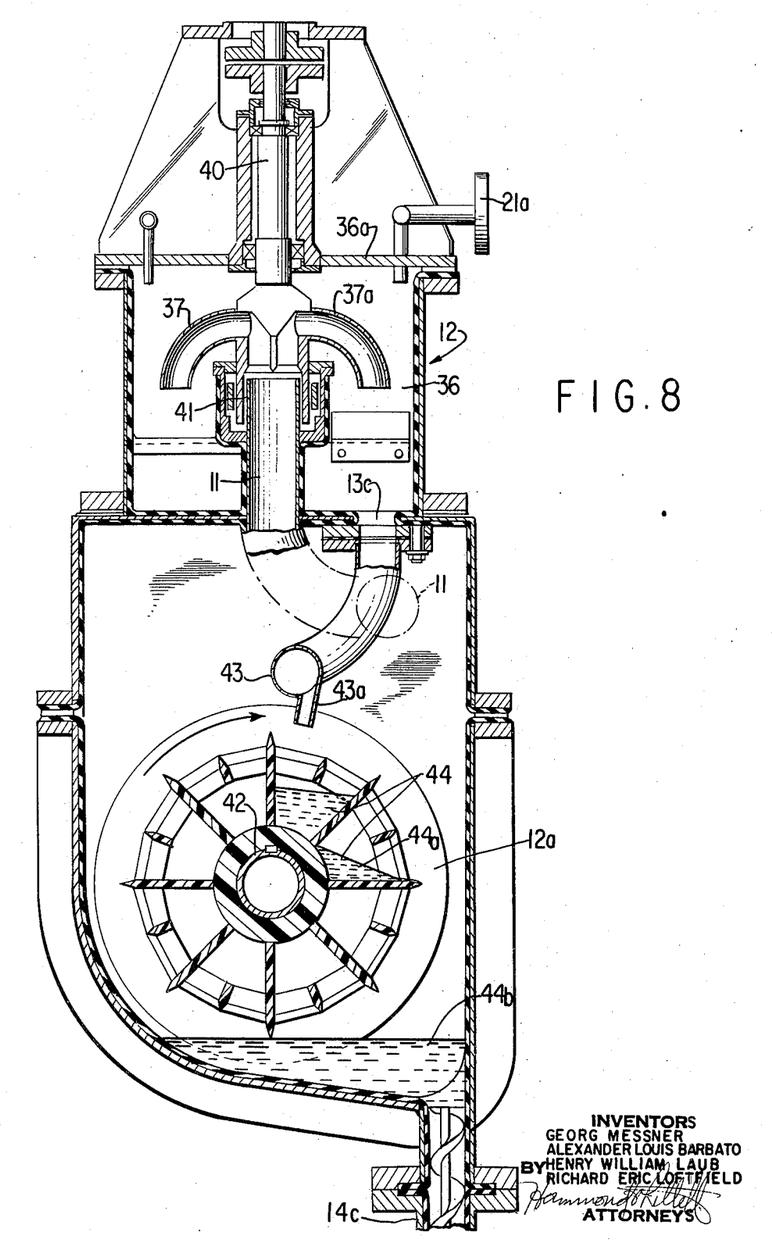
FIG. 8 is a sectional view taken along the line 8—8 of FIG. 6.

In the mercury feed circuit, the mercury proportionator 12 comprises a vertically disposed rubber lined cylindrical tank 36, FIGS. 7 and 8. Mercury conduit 11 from pump 10 passes upward through the tank 36 along the vertical axis thereof and terminates in a double inverted tube 37 and 37a. Tank 36 is closed by top 36a. For feeding a five tier bipolar cell, five separate compartments 38a, 38b, 38c, 38d and 38e, FIG. 7, are formed in tank 36 by virtical partitions 39. The compartments 38a, 38b, 38c, 38d and 38e are rubber lined and discharge at their lower end into conduits 13a, 13b, 13c, 13d and 13e leading to the five separate star wheels in circuit breaker 12a. Excess mercury is pumped through line 11 and flows back to pump 10 through conduit 12b. (See FIG. 1.)

A vertical shaft 40, FIG. 8, journaled through the top 36a is fastened at the axis of tubes 37 and 37a at its lower end and is driven by a source of rotative power (not shown) at its upper end.

In operation, mercury delivered by pump 10 through conduit 11 passes out of tubes 37 and 37a as a steady unbroken stream. Tubes 37 and 37a are connected to conduit 11 by any suitable packed joint 41. Tubes 37 and 37a are rotated by shaft 40 so that the mercury stream passes in turn over compartments 38a, 38b, 38c, 38d and 38e repeatedly and is equally proportioned in each compartment.

The mercury which enters compartments 38a, 38b, 38c, 38d and 38e flows by gravity through conduits 13a, 13b, 13c, 13d and 13e, FIG. 6, and through star wheel circuit breaker 12a and then to the cell tier through the conduits 14a, 14b, 14c, 14d and 14e. Windows 41a in the top of the star wheel circuit breaker cabinet permit observation of the circuit breaker in operation. As the compartments 38a, 38b, 38c, 38d and 38e are of equal size, substantially equal measured amounts of mercury are fed into each cell tier. This assures an equal amount of mercury flowing to and through each of the cell tiers.

Thus by means of mercury feed proportionator 12, the mercury feed stream is divided into substantially equal amounts for each tier and fed through the circuit breaker 12a to the separate cell tiers while preventing electrical contact between the mercury in the different cell tiers.

From the proportionator 12 the mercury for each tier flows through a star wheel or other type of circuit breaker 12a, FIGS. 6 and 8, which divides the mercury stream into a number of individually separate increments so that the circuit between each increment is broken and the cell tiers, operating at different voltages, may each be fed with a separate mercury stream and short circuiting back to the proportionating feeder 12 or between the feed streams or between the amalgam circuit breaker 15 and the separate tiers is prevented. A separate star wheel circuit breaker is provided for each tier. The star wheels may be mounted on a common horizontal shaft 42, FIG. 6, which may be driven by motor 42a or they may be permitted to rotate as a water wheel by the weight of the mercury falling by gravity on the blades thereof. From the star wheel feeder 12a the mercury flows through conduits 14a, 14b, 14c, 14d and 14e into the separate tiers of the cell. A substantially similar star wheel circuit breaker 15 is used for the amalgam at the discharge end of the cell tiers so that only one circuit breaker will be described in detail.

After the mercury has passed through cell tiers 1a, 1b, 1c, 1d and 1e and has become amalgam, the amalgam stream from each tier may be sent to separate decomposers as illustrated and the separate streams reunited in the pump reservoir from which the mercury is pumped from pump 10 to the proportionating feeder 12 or the amalgam streams may be recombined and sent through a single decomposer.

In the embodiment of mercury circuit breaker illustrated in FIGS. 6, 7, and 8, the mercury from the compartments 38a, 38b, 38c, 38d and 38e in proportionator 12a passes out through discharge conduits 13a, 13b, 13c, 13d and 13e. Each of these conduits terminates in an angled discharge cylinder 43 having an angled discharge passage 43a. The angle of the discharge passages with reference to shaft 42 is about 11°. This results in the mercury or amalgam being distributed more uniformly in time into the pools 44 in the star wheel compartments. The star wheels may be divided into any desired number of compartments. Eight compartments are shown in FIG. 8. Each compartment is insulated from the other and the five separate star wheels 42a, 42b, 42c, 42d and 42e are insulated from each other along the shaft 42 by insulating vertical partitions 45 which in the lower portion of the circuit breakers separate the pools of mercury or amalgam from each star wheel from each other.

As illustrated in FIG. 8, while the pool 44 is being filled from nozzle 43 the pool 44a has rotated to the point where it is ready to discharge into the pool 44b in the bottom of that particular star wheel compartment. From the pools 44b the mercury is discharged into the conduits 14a to 14e for feeding the cell tiers or in the amalgam circuit breaker 15 into the conduits leading from the amalgam circuit breaker 15 to the individual decomposers 16a, 16b, 16c, 16d and 16e. While star wheel circuit breakers perform satisfactorily, other forms of circuit breakers for both the inlet mercury and the outlet amalgam may be used.

Figure 15:
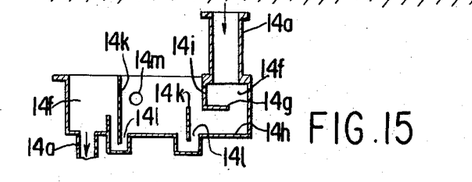
FIG. 15 is a sectional view of one form of water mercury separation which may be used.

FIG. 15 illustrates on an enlarged scale, one form of water mercury separator which may be used in each of the mercury feed lines 14a, 14b, 14c, 14d and 14e. In this embodiment, the water mercury mixture from the circuit breaker 12a, flowing through the lines 14a, etc., flows into a box 14f having a baffle 14g to break the mercury fall and onto the bottom plate 14h. Air may escape from the box 14f through a plurality of holes 14i, to the open atmosphere. The mercury flows through traps 14l under a plurality of dams 14k and out into the lines 14a, 14b, 14c, 14d and 14e leading to the cell tiers. Water separating from the mercury flows from opening 14m. Drainage openings may be provided in the bottom of the traps 14l to drain the mercury from the boxes 14f during periods of idleness.

Figure 12:
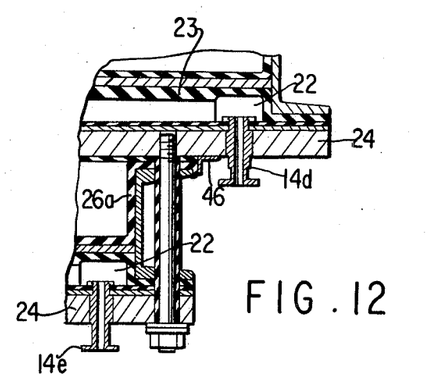
FIG. 12 is a detailed sectional view of the feed end of two tiers of a multi tier cell.

As illustrated in FIGS. 4 and 12, angle iron sections 46 are secured to the bottom of the cathode plates 24 for the top four tiers of the cell, where one tier extends beyond the other. These angle irons rest against the electrically insulated flange of the end wall of the next lower tier and prevent the inclined tiers from slipping with reference to each other during assembly.

Various wash water and flushing circuits, shut down circuits and valves therefor, mercury fill up starting circuits, heat exchangers, etc., normally provided for cells of the type described and well understood by persons skilled in the art have been omitted for clarity of the drawings and descriptions.

While we have described as a specific embodiment a five tier inclined plane cell, it will be understood that any number of tiers may be used and that various modifications and changes from the construction specifically illustrated may be made without departing from the spirit of our invention or the scope of the following claims.

We claim:

1. In a biopolar flowing mercury cathode electrolysis cell a plurality of parallel tiers mounted one on top of the other in offset relation and at an inclination from the horizontal, a cathode base plate in each tier over the top of which mercury flows and means on the bottom of each cathode base plate to suspend anodes within the tier below, means to introduce mercury from the bottom into the overhanging end of each tier, means to introduce into and to withdraw electrolyte from each tier, an insulating spreader bar in each tier under which the mercury flows for a substantial distance before coming into contact with the electrolyte, means to maintain each tier substantially filled with electrolyte, means to pass an electrolysis current through all of said tiers, means to form a plurality of swirling pools of amalgam at the lower end of each tier, and means to discharge amalgam from the bottom of each swirling pool of amalgam.

2. The electrolysis cell of claim 1 in which the cathode base plates are provided with a nickel surface over which the mercury flows.

3. The electrolysis cell of claim 1 in which the cathode base plates are provided with separate reversible nickel sheets over which the mercury flows.

4. The electrolysis cell of claim 1 in which a discharge trough running the width of each tier is provided to receive the amalgam discharged from each tier and each discharge trough has a plurality of flush valves therein.

5. The electrolysis cell of claim 1 in which the projecting ends of each tier is provided with windows over the swirling amalgam pools.

6. The electrolysis cell of claim 1 in which the amalgam stream from each tier is passed through a circuit breaker and each amalgam stream is fed to a separate decomposer located underneath the said electrolysis cell.

7. The electrolysis cell of claim 1 in which each cell tier is substantially rectangular and in which the side walls slope inwardly from the inlet end to the outlet end of each tier.

8. The electrolysis cell of claim 1 in which the means to introduce mercury into each tier is provided with a water mercury separating box having dams under which the mercury flows and water outlets above the mercury level in said box.

9. The electrolysis cell of claim 1 in which the tiers are mounted with an inclination of about 2° to about 85° from the horizontal.

References Cited

UNITED STATES PATENTS

| | | | |
|---|---|---|---|
| 673,754 | 5/1901 | Bell et al. | 204—220 XR |
| 2,648,630 | 8/1953 | Basilewsky | 204—219 |
| 2,719,117 | 9/1955 | Blue et al. | 204—220 |
| 2,848,408 | 8/1958 | Neipert et al. | 204—219 |
| 2,872,403 | 2/1959 | Honsberg | 204—220 |
| 2,898,284 | 8/1959 | Neipert et al. | 204—219 |

JOHN H. MACK, Primary Examiner

D. R. VALENTINE, Assistant Examiner

U.S. Cl. X.R.

204—220, 250